US012754139B1

(12) United States Patent
Beeson

(10) Patent No.: US 12,754,139 B1
(45) Date of Patent: Oct. 6, 2026

(54) OPTICAL INSPECTION OF WATERJET DRILLED HOLES

(71) Applicant: RTX Corporation, Farmington, CT (US)

(72) Inventor: William Joseph Beeson, San Diego, CA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/173,508

(22) Filed: Apr. 8, 2025

(51) Int. Cl.

| | |
|---|---|
| ***G01N 21/84*** | (2006.01) |
| ***G01N 21/88*** | (2006.01) |
| ***G01N 21/956*** | (2006.01) |
| ***G06T 7/00*** | (2017.01) |
| ***G06T 7/13*** | (2017.01) |
| ***G06T 7/246*** | (2017.01) |
| ***G06T 7/73*** | (2017.01) |

(52) U.S. Cl.
CPC ..... *G01N 21/8422* (2013.01); *G01N 21/8851* (2013.01); *G01N 21/95692* (2013.01); *G06T 7/001* (2013.01); *G06T 7/13* (2017.01); *G06T 7/246* (2017.01); *G06T 7/74* (2017.01); *G01N 2021/8411* (2013.01); *G01N 2021/8427* (2013.01); *G06T 2207/30164* (2013.01)

(58) Field of Classification Search
CPC ........... G01N 21/8422; G01N 21/8851; G01N 21/95692; G01N 2021/8411; G01N 2021/8427; G06T 7/001; G06T 7/13; G06T 7/246; G06T 7/74; G06T 2207/30164
See application file for complete search history.

(56) References Cited

U.S. PATENT DOCUMENTS 4,930,890 A 6/1990 Hara et al.
5,532,817 A * 7/1996 DeVries ................ C09K 11/06 356/318

(Continued)

FOREIGN PATENT DOCUMENTS

JP 2022100278 A 7/2022

OTHER PUBLICATIONS

H.-T. Liu: "Hole drilling with abrasive fluidjets", The International Journal of Advanced Manufacturing Technology Springer, Berlin, DE, vol. 32, No. 9-10, May 23, 2006, pp. 942-957.

(Continued)

*Primary Examiner* — Timothy R Newlin
(74) *Attorney, Agent, or Firm* — Kinney & Lange, P.A.

(57) ABSTRACT

A method of inspecting erosion of a coating on a component at an outlet of a through-hole formed by waterjet drilling includes positioning a camera to face the outlet; positioning a light source at a first position from an inlet opposite the outlet of the through-hole; capturing a first image data of the outlet and surrounding coating with the camera while the light source is at the first position; positioning the light source at a second position from the inlet, wherein the first position is located between the inlet and the second position; capturing a second image data of the outlet and surrounding coating with the camera while the light source is at the second position; and determining an amount of erosion of the coating at the outlet by comparing the first image data to the second image data.

18 Claims, 6 Drawing Sheets

(56) References Cited

U.S. PATENT DOCUMENTS

| | | | | |
|---|---|---|---|---|
| 5,533,146 | A * | 7/1996 | Iwai | B23K 9/0956 348/90 |
| 5,610,710 | A * | 3/1997 | Canfield | G01N 21/95692 356/136 |
| 5,946,029 | A * | 8/1999 | Yoshimura | H04N 7/18 382/141 |
| 6,963,396 | B2 * | 11/2005 | Kimberlin | G01N 21/95692 356/241.1 |
| 10,215,695 | B1 * | 2/2019 | Farooq | G01N 21/8806 |
| 10,520,301 | B1 * | 12/2019 | Tobiason | G06T 1/0014 |
| 2002/0054291 | A1 * | 5/2002 | Tsai | G01N 21/95607 356/394 |
| 2004/0227079 | A1 * | 11/2004 | Nara | H01J 37/28 250/310 |
| 2005/0152615 | A1 * | 7/2005 | Hutchinson | G06T 5/92 382/274 |
| 2005/0174584 | A1 * | 8/2005 | Chalmers | G03F 7/70483 356/630 |
| 2006/0159330 | A1 * | 7/2006 | Sakai | G06T 7/0004 382/141 |
| 2012/0236318 | A1 * | 9/2012 | Aoki | G01B 11/2527 356/613 |
| 2012/0249778 | A1 * | 10/2012 | Satou | G01B 11/06 348/125 |
| 2013/0177232 | A1 * | 7/2013 | Hirano | G06T 7/0004 382/141 |
| 2014/0071243 | A1 * | 3/2014 | Nakatsukasa | G01B 11/24 348/46 |
| 2015/0369059 | A1 | 12/2015 | Burd et al. | |
| 2016/0321797 | A1 * | 11/2016 | Richard | G06T 7/0006 |
| 2016/0349496 | A1 * | 12/2016 | Watanabe | G02B 26/06 |
| 2017/0309013 | A1 * | 10/2017 | Takayama | G06T 7/001 |
| 2017/0330316 | A1 * | 11/2017 | Czaplewski | G06T 7/13 |
| 2018/0150058 | A1 * | 5/2018 | Shapiro | G05B 19/4093 |
| 2018/0259461 | A1 * | 9/2018 | Haynes | G01B 17/02 |
| 2018/0357757 | A1 * | 12/2018 | Kuwasako | G01N 21/8851 |
| 2020/0264459 | A1 * | 8/2020 | Li | G01N 21/95 |
| 2021/0073970 | A1 * | 3/2021 | Afrasiabi | G01B 11/0616 |
| 2022/0198631 | A1 * | 6/2022 | Yamamoto | G06V 20/80 |
| 2022/0214286 | A1 * | 7/2022 | Yacoubian | G01N 21/9515 |
| 2022/0373460 | A1 * | 11/2022 | Gaskey | G01N 21/4788 |
| 2023/0075297 | A1 * | 3/2023 | Brauer | G06T 7/001 |
| 2023/0316478 | A1 * | 10/2023 | Danen | G01N 21/8851 382/149 |
| 2025/0076033 | A1 * | 3/2025 | Fuyuno | G01B 11/2518 |
| 2025/0100735 | A1 * | 3/2025 | Taguchi | G01N 21/8851 |

OTHER PUBLICATIONS

Extended European Search Report dated Aug. 24, 2026, for corresponding European Patent Application No. 26171305.1-1001, 6 pages.

* cited by examiner

SECT. D-D

SECT. E-E

Light Source at L1

Light Source at L2

OPTICAL INSPECTION OF WATERJET DRILLED HOLES

BACKGROUND

Gas turbine engines can operate at very high temperatures for long periods of time. Various components of gas turbine engines can be exposed to very hot gases, such as the gases produced in the combustion chamber of gas turbine engines. These products of combustion provide high thermal exposure to various components, such as, for example, combustion liners, turbine blades, and nozzle guide vanes. Insufficient cooling of these components can result in local thermal cracks and can reduce the strength of the components' materials. Thermal Barrier Coatings ("TBC") deposited on surfaces exposed to high temperatures or combustion gases can be used to protect these components to extend their usable life cycle. Chemical products of combustion can corrode both the substrate and coatings. Environmental Barrier Coatings ("EBC") are used to protect the component from corrosion. To further protect component surfaces, a series of through-holes, or cooling holes, can be provided to introduce a film of cooling air flow to the TBC and/or EBC coated surface.

SUMMARY

The present summary is provided only by way of example, and not limitation. Other aspects of the present disclosure will be appreciated in view of the entirety of the present disclosure, including the entire text, claims and accompanying figures.

A method of inspecting erosion of a coating on a component at an outlet of a through-hole formed by waterjet drilling includes positioning a camera to face the outlet; positioning a light source at a first position from an inlet opposite the outlet of the through-hole; capturing a first image data of the outlet and surrounding coating with the camera while the light source is at the first position; positioning the light source at a second position from the inlet, wherein the first position is located between the inlet and the second position; capturing a second image data of the outlet and surrounding coating with the camera while the light source is at the second position; and determining an amount of erosion of the coating at the outlet by comparing the first image data to the second image data.

Figure 1A:
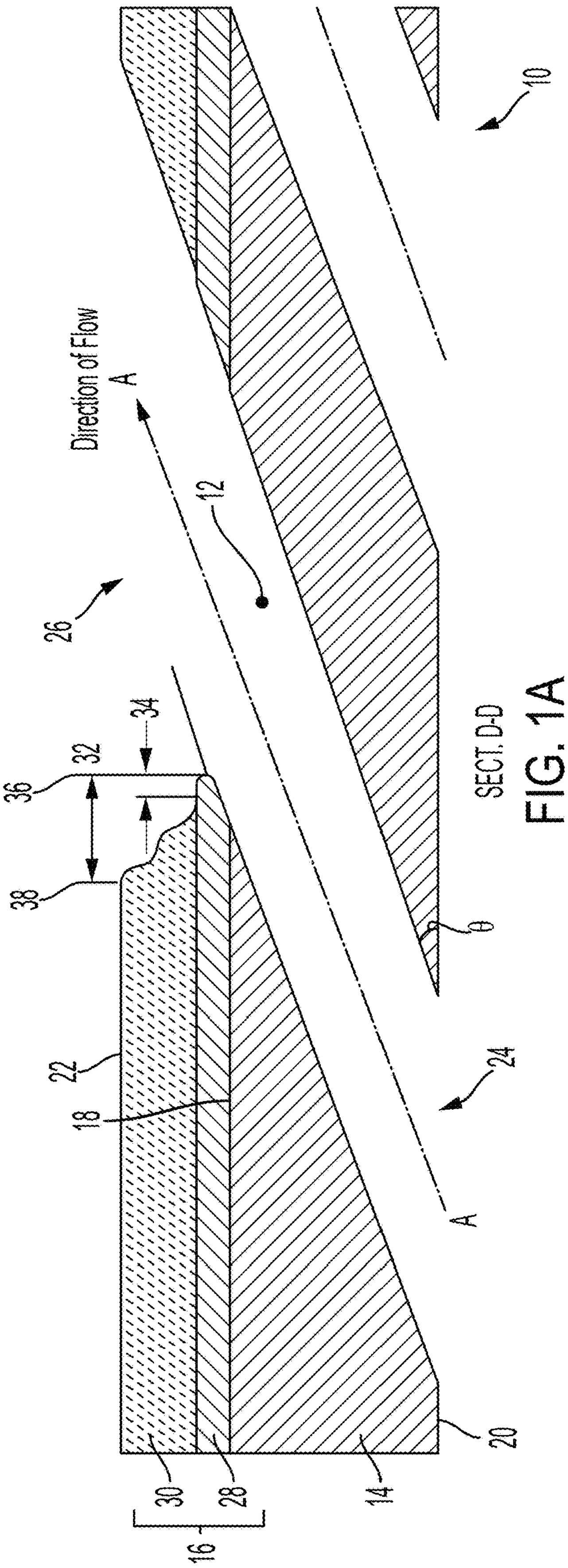
FIG. 1A is a cross-sectional view of a component with a through-hole formed by the waterjet drilling process.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Waterjet drilling can be used to form cooling holes in a component comprising a TBC and/or EBC. Waterjet drilling removes material by erosion with a stream of waterjet spray at various pressures. This erosion of material is also known as kerf. In some instances, waterjet spray through the TBC and/or EBC may produce undesirable erosion of such coatings on the component surface, which can leave the underlying substrate susceptible to degradation. The present disclosure is directed to optical inspection of holes to identify and measure erosion of the TBC and/or EBC created by the waterjet drilling process.

Figure 1B:
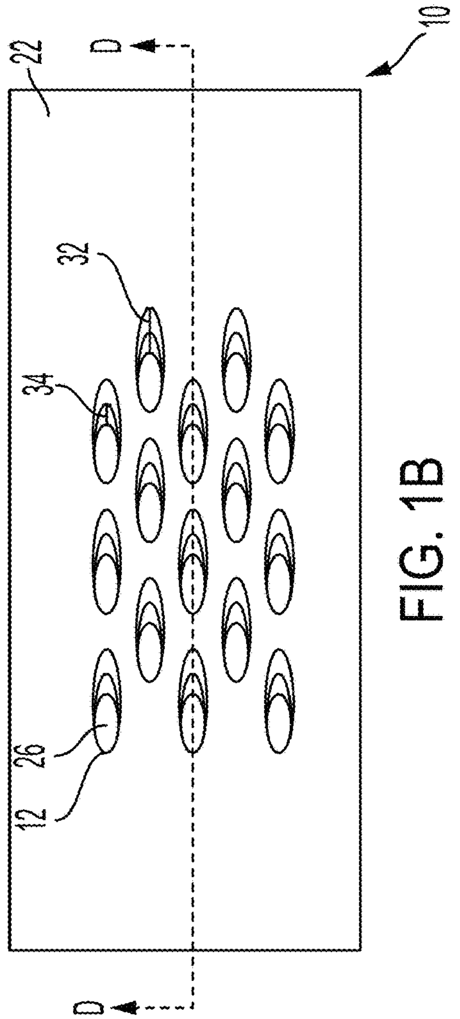
FIG. 1B is a plan view of a component with a plurality of through-holes formed according to FIG. 1A.

FIG. 1A is a cross-sectional view of component 10 with through-hole 12 formed by a waterjet drilling process. FIG. 1B is a plan view of component 10 with a plurality of through-holes 12. FIG. 1A is a cross-sectional view taken along line D-D of FIG. 1B.

FIG. 1A shows component 10 including substrate 14, coating 16 and through-hole 12. Substrate 14 includes oppositely disposed surfaces 18 and 20. Coating 16 is disposed on substrate surface 18 and forms outlet surface 22. Through-hole 12 includes inlet 24 at surface 20 and outlet 26 at outlet surface 22.

Component 10 can be, for example, a combustion chamber wall or panel configured to define a combustion chamber. Coating 16 can be, for example, a TBC and/or an EBC. In some examples coating 16 can include metallic layer 28 and ceramic layer 30. Metallic layer 28 can be, for example, an MCrAlY bond coat applied directly to substrate 14 on substrate surface 18. Ceramic layer 30 can be deposited on metallic layer 28 and can define surface 22. Ceramic layer 30 can comprise one or more ceramic materials, including for example, yttria-stabilized zirconia and/or gadolinium zirconate, suitable for protecting substrate 14 from exposure of combustion gases during operation within a gas turbine engine. Substrate 14 can be an alloy suitable for high temperature operation.

Through-hole 12 is provided through substrate 14 and coating 16 by waterjet drilling from surface 20. As illustrated in FIG. 1A, through-hole 12 can be oriented at angle θ relative to surface 20. Through-hole 12 has central axis A-A, extending from inlet 24 to outlet 26. Through-hole 12 can be substantially cylindrical through substrate 14. Through-hole 12 can have an expansion region through coating 16 caused by erosion of coating 16 and, specifically, erosion of ceramic layer 30, as illustrated by ceramic erosion 32 and exposed metallic 34 adjacent to outlet 26. The process of waterjet drilling through-hole 12 at angle θ can create a kerf width at outlet 26 of through-hole 12 with oblong or oval characteristics. A kerf is a gap created by a cutting tool as it removes material from the targeted workpiece. A kerf width depends on, among other things, the cutting tool used, the material cut, the angle of cutting, and the water pressure used for the cutting process. When water pressure is reduced in a waterjet drilling process, the hole experiences more jet stream exposure time which can increase removal or erosion of material adjacent to outlet 26, resulting in a wider kerf width at outlet 26. This may lead to undesirable TBC and/or EBC erosion. Too much erosion may expose metallic layer 28 and/or substrate 14 to temperatures higher than their safe thermal-exposure specification which may lead to quicker material deterioration.

In this embodiment, waterjet spray forms through-hole 12 at an angle θ, between 45° and 90°, relative to surface 20. As waterjet spray exits through-hole 12 during manufacturing, it can erode sidewalls of coating 16 adjacent to outlet 26 thus increasing ceramic erosion 32 thus revealing substrate 14 and/or exposed metallic 28 to undesired thermal conditions. As illustrated in FIGS. 1A and 1B, erosion can preferentially occur along one side of through-hole 12 adjacent to outlet 26. Ceramic erosion 32 can be measured longitudinally from innermost edge 36 defined by metallic layer 28 in through-hole 12 to outermost edge 38 of outlet 26 defined by ceramic layer 30 at outlet surface 22. Innermost edge 36 is an edge of a sidewall of through-hole 12 from which ceramic erosion 32 extends. Ceramic erosion 32 can further be measured, parallel to the outlet surface 22, a maximum distance of erosion from innermost edge 36 of a sidewall of through-hole 12 to outermost edge 38 of outlet 26. Ceramic erosion 32 can vary in width about through-hole 12 at outlet 26.

FIG. 1B shows a plan view of a portion of component 10, facing outlet surface 22, with a plurality of through-holes 12. FIG. 1B shows through-holes 12, outlet 26, ceramic erosion 32, and exposed metallic 34. As illustrated, through-holes 12 formed by waterjet drilling can have oval-characteristic outlets 26 with elongated ceramic erosion 32 and exposed metallic 34.

Figure 2A:
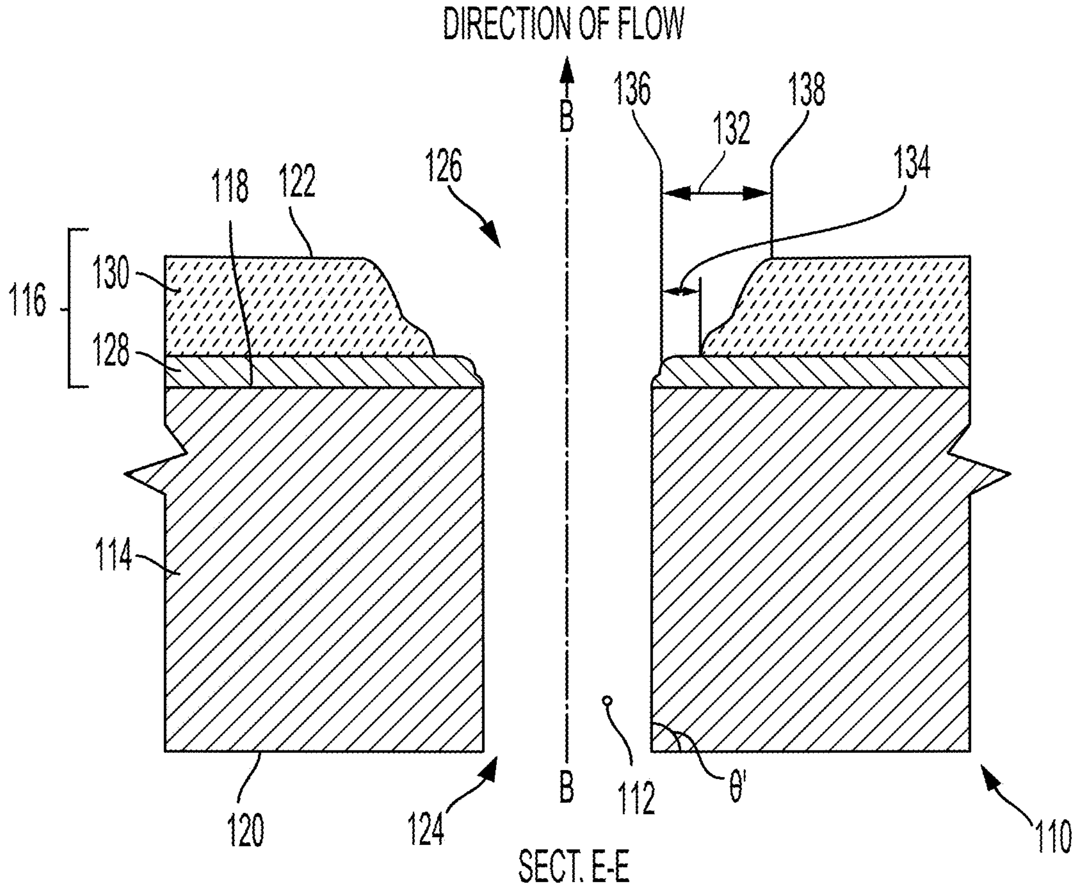
FIG. 2A is a cross-sectional view of another component with a through-hole formed by a waterjet drilling process.
Figure 2B:
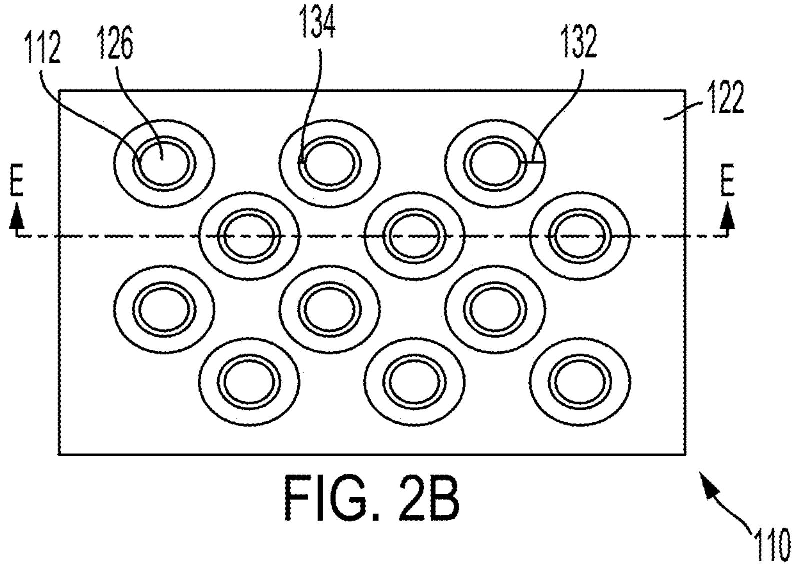
FIG. 2B is a plan view of a component with a plurality of through-holes formed according to FIG. 2A.

FIG. 2A is a cross-sectional view of component 110 with through-hole 112 formed by waterjet drilling process. FIG. 2B is a plan view of component 110 with a plurality of through-holes 112. FIG. 2A is a cross-sectional view taken along line E-E of FIG. 2B.

FIG. 2A shows component 110, substrate 114, coating 116, and through-hole 112.

FIG. 2A is substantially similar to FIG. 1A. Substrate 114 includes oppositely disposed surfaces 118 and 120. Coating 116 is disposed on substrate surface 118 and forms outlet surface 122. Through-hole 112 includes inlet 124 at surface 120 and outlet 126 at outlet surface 122. Coating 116 can be, for example, a TBC and/or an EBC. In some examples coating 116 can include metallic layer 128 and ceramic layer 130 as described with respect to FIGS. 1A and 1B. Component 110 can be substantially similar to component 10 with through-hole 112 drilled at an angle θ perpendicular to inlet surface 120, which can produce a generally circular outlet 126 and region of ceramic erosion 132.

The process of waterjet drilling through-hole 112 at angle θ', perpendicular to inlet surface 120, may create a kerf width at outlet 126 of through-hole 112 with circular-characteristics. Too much erosion may expose metallic layer 128 and/or substrate 14 to temperatures higher than their safe thermal-exposure specification which may lead to quicker material deterioration.

Through-hole 112 is provided through substrate 114 and coating 116 by waterjet drilling from surface 120. Through-hole 112 has central axis B-B, extending from inlet 124 to outlet 126. Through-hole 112 can be substantially cylindrical through substrate 114. Through-hole 112 can have an expansion region through coating 116 caused by erosion of coating 116 and, specifically, erosion of ceramic layer 130, as illustrated by ceramic erosion 132 and exposed metallic 134 adjacent to outlet 126. The process of waterjet drilling through-hole 112 at angle θ', perpendicular to inlet surface 120, can create a kerf width at outlet 126 of through-hole 112 with circular characteristics.

As waterjet spray exits through-hole 112 during manufacturing, it can erode sidewalls of coating 116 adjacent to outlet 126 thus increasing ceramic erosion 132 and revealing exposed metallic 134. As illustrated in FIGS. 2A and 2B, erosion can preferentially occur along one side of through-hole 112 adjacent to outlet 126. Ceramic erosion 132 can be measured longitudinally from innermost edge 136 defined by metallic layer 128 in through-hole 112 to outermost edge 138 of outlet 126 defined by ceramic layer 130 at outlet surface 122. Innermost edge 136 is an edge of a sidewall of through-hole 112 from which ceramic erosion 132 extends. Ceramic erosion 132 can further be measured, parallel to the outlet surface 122, a maximum distance of erosion from innermost edge 136 of a sidewall of through-hole 112 to outermost edge 138 of outlet 126. Ceramic erosion 132 can vary in width about through-hole 112 outlet 126.

FIG. 2B shows a plan view of portion of component 110, facing outlet surface 122, with a plurality of through-holes 112. FIG. 2B shows through-holes 1121, outlet 126, ceramic erosion 132, and exposed metallic 134. As illustrated, through-holes 112 formed by waterjet drilling can have circular characteristic outlet 126 with circular ceramic erosion 132 and exposed metallic 134.

Figure 3A:
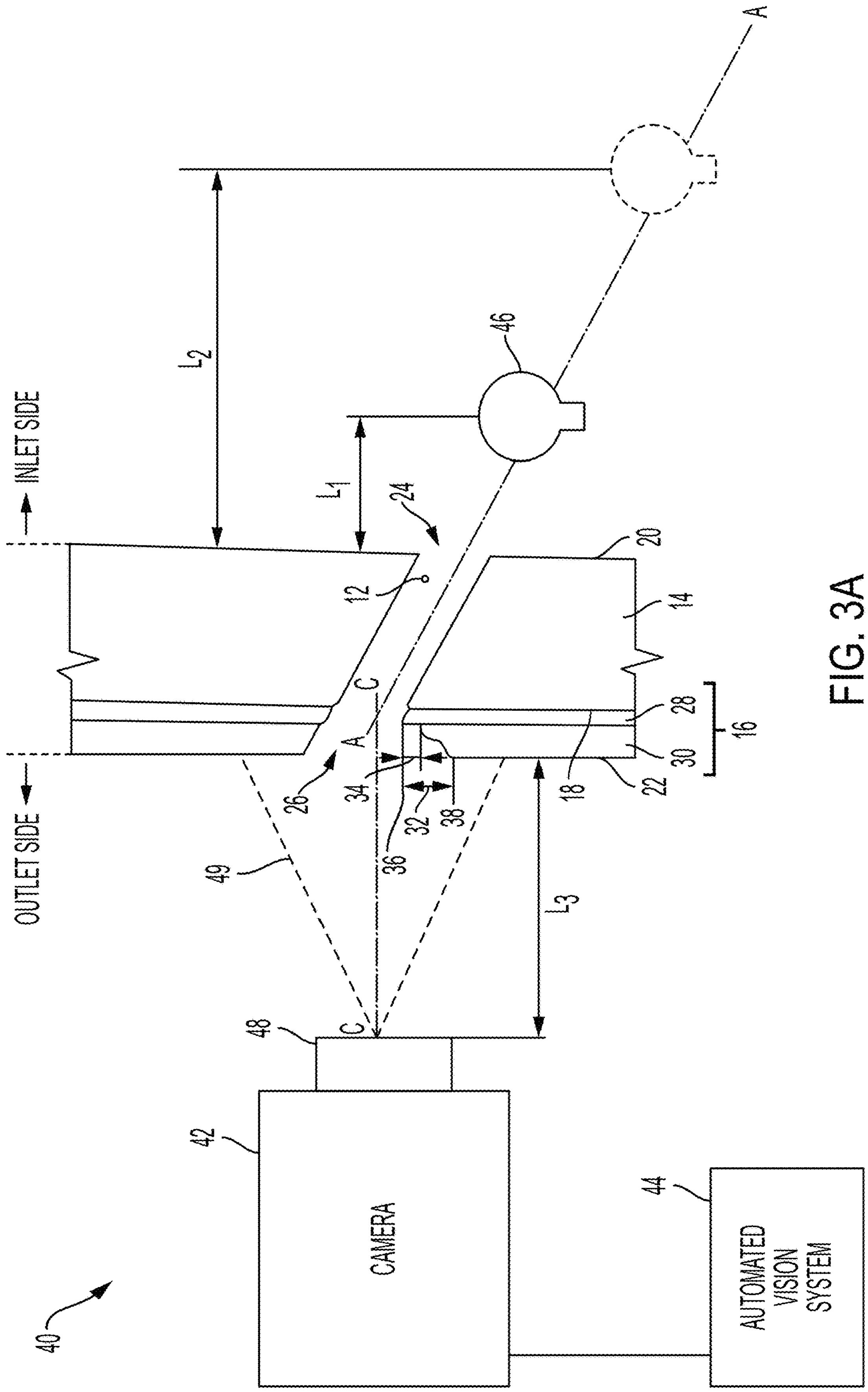
FIG. 3A is a schematic of a method of inspecting erosion of a coating at an outlet of a through-hole formed according to FIG. 1A.

FIG. 3A is a schematic of a method of inspecting erosion of a coating at an outlet of through-hole 12 formed by waterjet process as described with respect to FIGS. 1A and 1B. FIG. 3A shows monitoring system 40, camera 42, automated vision system 44, and light source 46 used to inspect component 10, which includes substrate 14, coating 16 and through-hole 12. Substrate 14 includes oppositely disposed surfaces 18 and 20. Coating 16 is disposed on substrate surface 18 and forms outlet surface 22. As previously described, coating 16 can include metallic layer 28 and ceramic layer 30. Through-hole 12 includes inlet 24 at surface 20 and outlet 26 at outlet surface 22. Coating 16 can include ceramic erosion 32 and exposed metallic 34 adjacent to outlet 26 formed by the waterjet drilling process.

Camera 42 is positioned on the outlet side of through-hole 12 at fixed position $L_3$ from outlet surface 22, its lens 48 centered on axis C-C. Axis C-C can intersect through-hole central axis A-A, centering lens 48 over through-hole 12. Camera 42 can capture image data of walls of through-hole 12 and outlet surface 22. Specifically, camera 42 can be configured to capture image data in the region of outlet 26, including ceramic erosion 32 and exposed metallic 34 within camera view 49. Captured image data of ceramic erosion 32 is defined by innermost edge 36 and outermost edge 38, as previously discussed. Camera 42 can be configured to capture video, still images, or both. Camera 42 can be positioned at fixed distance $L_3$ either by an automated process or by a manual process. Either positioning process can predetermine camera 42 fixed positioning such that camera 42 captures one through-hole 12 in camera view 49 or a plurality of through-holes 12 in camera view 49. Camera 42 can operate in ambient light conditions on the outlet side during this method of inspection. The ambient light condition can be controlled either by an automated process or by a manual process to maintain constant surrounding ambient light conditions that do not interfere with camera image data as described further herein. Light source 46 is positioned on the inlet side of through-hole 12 opposite camera 42 and configured to illuminate through-hole 12 as described further herein.

Camera 42 can be communicatively connected to automated vision system 44. Automated vision system 44 processes image data transmitted from camera 42. Camera 42 can transmit image data in the form of JPEG, PNG, MPG or any equivalent image data form used by those of ordinary skill in the art.

Light source 46 is configured to illuminate through-hole 12 from inlet side. Unlike camera 42, which can be maintained at fixed position $L_3$ while inspecting through-hole 12 and outlet 26, light source 46 can be positioned at first position $L_1$, relative to surface 20, and positioned at second position $L_2$, relative to surface 20. Light source 46 can be movable between first position $L_1$ and second position $L_2$ from surface 20 along central axis A-A. In this embodiment, first position $L_1$ is closer in distance to the surface 20 than second position $L_2$. As illustrated in FIG. 3A, light source 46 can coincide with the central axis A-A of the through-hole 12. In other embodiments, one or both first position $L_1$ and second position $L_2$ can be offset from the central axis A-A of through-hole 12. As discussed further herein, the locations of first position $L_1$ and second position $L_2$ are selected to enable camera 42 to capture image data with varying degrees of contrast at outlet 26.

Light source 46 can be a single light source or a plurality of light sources capable of producing light, which can include visible light or other wavelengths in the electromagnetic spectrum. Light source 46 can be moved along hole axis A-A by an automated process or by a manual process. In other embodiments, a first light source 46 can be located at first position $L_1$ and a second light source 46 can be located at second position $L_2$.

Monitoring system 40 inspects erosion by capturing and comparing image data collected on the outlet side of through-hole 12 (at outlet 26) with camera 42 while light source 46 is at first position $L_1$ and second position $L_2$ on the inlet side of through-hole 12 (adjacent to surface 20).

Camera 42 can be positioned at fixed position $L_3$ from outlet surface 22 with lens 48 centered on axis C-C on the outlet side of through-hole 12. Meanwhile, light source 46 can be positioned at first position $L_1$ from surface 20 on the inlet side of through-hole 12. Light source 46 can be positioned to illuminate areas of through-hole 12 including substrate 14, coating 16, and outlet 26. Illuminated coating 16 adjacent to outlet 26 can include metallic layer 28, ceramic layer 30, ceramic erosion 32, and exposed metallic 34. Light source 46 can produce light from first position $L_1$ on the inlet side, which can then travel via through-hole 12 to the outlet side, where camera 42 can capture first image data on the outlet side. Camera 42 can transmit the captured first image data to automated vision system 44 for analysis.

Light source 46 can be positioned at second position $L_2$ from surface 20 on the inlet side of through-hole 12. Alternatively, a second light source 46 positioned at second position $L_2$ can be turned on and light source 46 located at first position $L_1$ can be turned off. Light source 46 can be positioned to illuminate areas of through-hole 12 including substrate 14, coating 16, and outlet 26. Illuminated coating 16 adjacent to outlet 26 can include metallic layer 28, ceramic layer 30, ceramic erosion 32, and exposed metallic 34. Light source 46 can produce light from second position $L_2$ on the inlet side, which can then travel via through-hole 12 to the outlet side, and camera 42 can capture second image data on the outlet side. Camera 42 can transmit the captured second image data to automated vision system 44 for analysis.

Figure 3B:
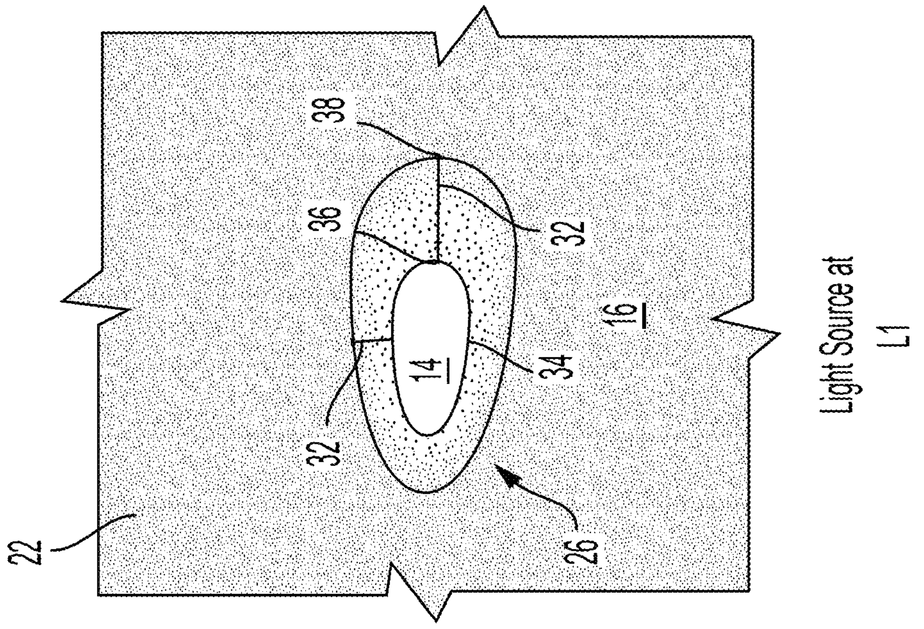
FIG. 3B is a plan view of the outlet of the through-hole of FIG. 3A while a light source is positioned at a first position illuminating an inlet of the through-hole of FIG. 3A.
Figure 3C:
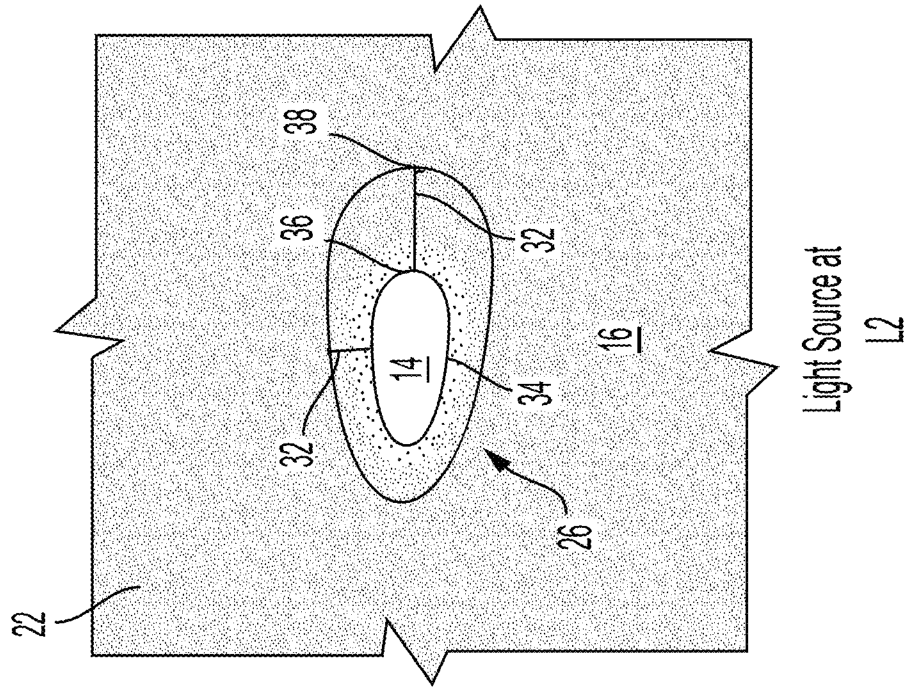
FIG. 3C is a plan view of the outlet of the through-hole of FIG. 3A while the light source is positioned at a second position illuminating an inlet of the through-hole.

FIGS. 3B and 3C are schematic views of captured first image data and captured second image data of through-hole 12 and outlet 26 in component 10. FIG. 3B shows first image data captured when light source 46 is at first portion $L_1$. FIG. 3C shows second image data captured when light source 46 is at second position $L_2$. FIGS. 3B and 3C show outlet 26 at outlet surface 22. Image data can include ceramic erosion 32 and exposed metallic 34. Exposed metallic 34 may or may not be discernable in the captured image data.

As illustrated in FIG. 3B, light source 46 illuminates part of through-hole 12 but not all. The light of light source 46 naturally cannot reach all visible surface areas captured by camera 42 due, in part, to the angle of the light relative to outlet surface 22, the angle of a surface illuminated by the light, and the amount of erosion present in ceramic erosion 32 causing uneven surfaces where light cannot reach. Light source 46 illuminates substrate 14 and coating 16, adjacent to outlet 26, including ceramic erosion 32 and exposed metallic 34, to the extent possible at first position $L_1$. The contrast (lightness/darkness) of illumination will vary across ceramic erosion 32 surface between innermost edge 36 outermost edge 38 as shown in FIG. 3B.

As illustrated in FIG. 3C, light source 46 at second position $L_2$ similarly illuminates part of through-hole 12 but not all. The light of light source 46 naturally cannot reach all visible surface areas captured by camera 42 due, in part, to angle of the light relative to outlet surface 22, the angle of a surface illuminated by the light, and the amount of erosion present in ceramic erosion 32 causing uneven surfaces where light cannot reach. Light source 46 illuminates substrate 14 and coating 16 adjacent to outlet 26, including ceramic erosion 32 and exposed metallic 34, to the extent possible at second position $L_2$. The contrast of illumination will vary across ceramic erosion 32 surface between innermost edge 36 and outermost edge 38, as shown in FIG. 3C.

The contrast in the image data captured by camera 42 of ceramic erosion 32 between innermost edge 36 and outermost edge 38 can vary significantly when light source 46 is located at first position $L_1$ and light source 46 is located second position $L_2$, while contrast of outlet surface 22 and interior walls of hole through substrate 14 does not substantially change. Automated vision system 44 is configured to compare first image data and second image data to identify the region in which the contrast varies and thereby identify the extent of ceramic erosion 32.

Automated vision system 44 can analyze images through digital edge detection analysis methods on a computer. These edge detection methods can include a search-based method, a zero-crossing based method, or other edge detection methods known in the art. Automated vision system 44 can set a threshold of optical characteristics, apply smoothing filters to determine edge strengths present in an image, and analyze each image accordingly. For a black and white image edge detection method using visible light, an edge threshold value for grayscale can be determined. This threshold can be a minimum, maximum, or both defining a range of grayscale. Image pixels which meet the threshold criteria can be identified by automated vision system 44 and an edge of a drilled through-hole can be defined as well as the associated erosion zone. The first captured image and second captured image (see FIGS. 3A & 3B) are analyzed and changes in the grayscale within the areas enclosed by the defined edge which meet the threshold grayscale criteria can be isolated. That isolated area is the erosion zone of the waterjet drilling process. Other forms of light and methods can be used to analyze the images to identify edges of the hole and erosion zone and to differentiate between the two characteristics of an analyzed image.

Figure 4A:
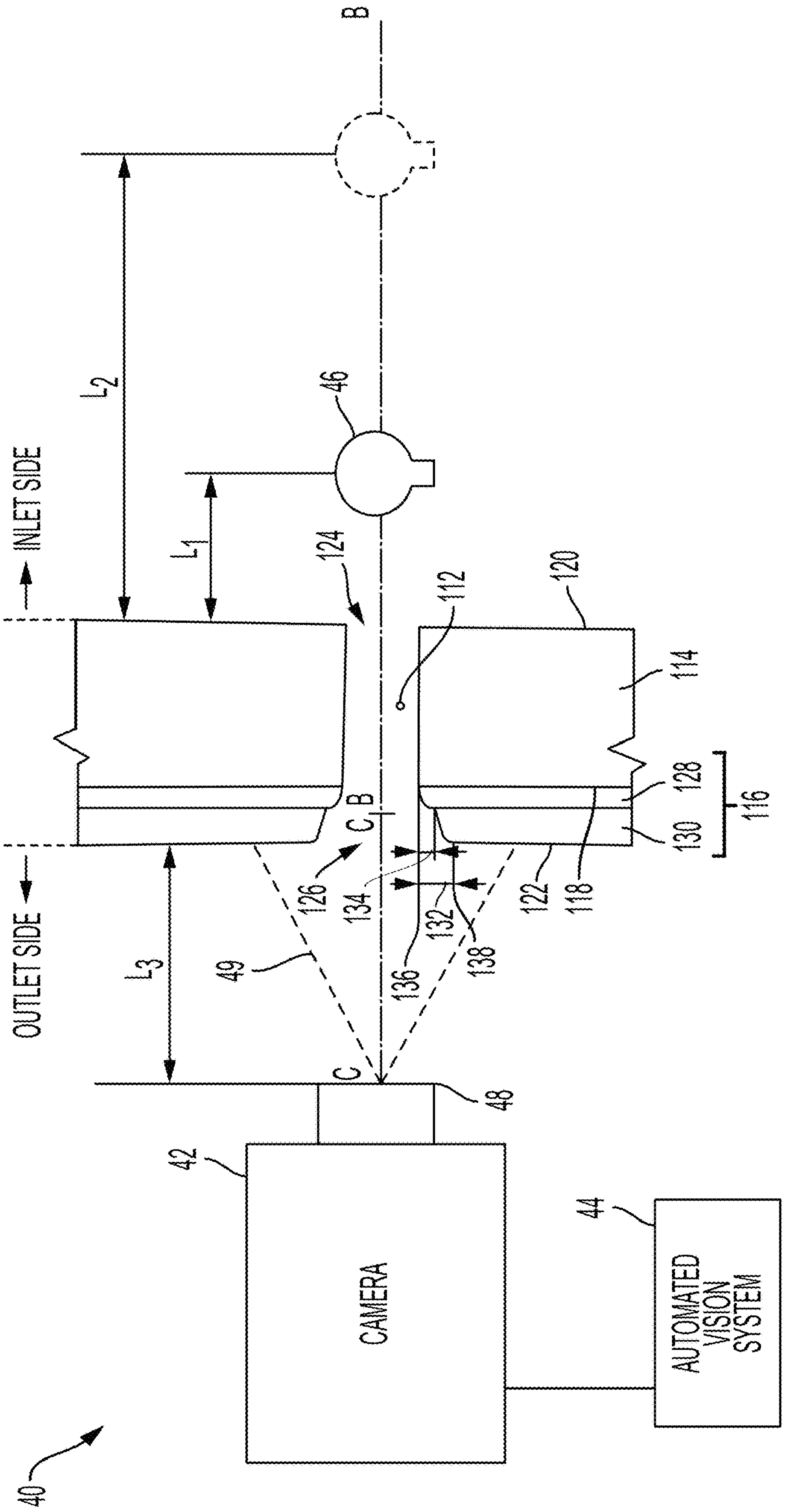
FIG. 4A is a schematic for a method of inspecting erosion of a coating at an outlet of a through-hole formed according to FIG. 1B.

FIG. 4A is a schematic for a method of inspecting erosion of a coating at an outlet of a through-hole 112 formed by waterjet process as described with respect to FIGS. 2A and 2B. FIG. 4A shows monitoring system 40, camera 42, automated vision system 44, and light source 46 used to inspect component 110, which includes substrate 114, coating 116 and through-hole 112. Substrate 114 includes oppositely disposed surfaces 118 and 120. Coating 116 is disposed on substrate surface 118 and forms outlet surface 122. As previously described, coating 116 can include metallic layer 128 and ceramic layer 130. Through-hole 112 includes inlet 124 at surface 120 and outlet 126 at outlet surface 122. Coating 116 can include ceramic erosion 132 and exposed metallic 134 adjacent to outlet 126 formed by the waterjet drilling process.

Camera 42 is positioned on the outlet side of through-hole 112 at fixed position $L_3$ from outlet surface 122, its lens 48 centered on axis C-C. Axis C-C can intersect through-hole central axis B-B, centering lens 48 over through-hole 112. Camera 42 can capture image data of walls of through-hole 112 and outlet surface 122. Specifically, camera 42 can be configured to capture image data in the region of outlet 126, including ceramic erosion 132 and exposed metallic 134 within camera view 49. Captured image data of ceramic erosion 132 is defined by innermost edge 136 and outermost edge 138, as previously discussed. Camera 42 can be configured to capture video, still images, or both. Camera 42 can be positioned at fixed distance $L_3$ either by an automated process or by a manual process. Either positioning process can pre-determine camera 42 fixed positioning such that camera 42 captures one through-hole 112 in camera view 49 or a plurality of through-holes 112 in camera view 49. Camera 42 can operate in ambient light conditions on the outlet side during this method of inspection. The ambient light condition can be controlled either by an automated process or by a manual process to maintain constant surrounding ambient light conditions that do not interfere with camera image data as described further herein. Light source 46 is positioned on the inlet side of through-hole 112 opposite camera 42 and configured to illuminate through-hole 112 as described further herein.

Camera 42 can be communicatively connected to automated vision system 44. Automated vision system 44 processes image data transmitted from camera 42. Camera 42 can transmit image data in the form of JPEG, PNG, MPG or any equivalent image data form used by those of ordinary skill in the art.

Light source 46 is configured to illuminate through-hole 112 from inlet side. Unlike camera 42, which can be maintained at fixed position $L_3$ while inspecting through-hole 112 and outlet 126, light source 46 can be positioned at first position $L_1$, relative to surface 120, and positioned at a second position $L_2$, relative to surface 120. Light source 46 can be movable between first position $L_1$ and second position $L_2$ from surface 120 along central axis B-B. In this embodiment, first position $L_1$ is closer in distance to surface 120 than second position $L_2$. As illustrated in FIG. 4A, light source 46 can coincide with the center of the through-hole 112 and central axis B-B. In other embodiments, one or both first position $L_1$ and second position $L_2$ can be offset from the central axis B-B of through-hole 112. As discussed further herein, the locations of first position $L_1$ and second position $L_2$ are selected to enable camera 42 to capture image data with varying degrees of contrast at outlet 126.

Light source 46 may be a single light source or a plurality of light sources capable of producing light, which can include visible light or wavelengths in the electromagnetic spectrum. Light source 46 may be moved along central axis B-B by an automated process or by a manual process. In other embodiments, a first light source 46 can be located at first position $L_1$ and a second light source 46 can be located at second position $L_2$.

Monitoring system 40 inspects erosion by capturing and comparing image data collected on the outlet side of through-hole 112 (at outlet 126) with camera 42 while light source 46 is at first position $L_1$ and second position $L_2$ on the inlet side of through-hole 112 (adjacent to surface 120).

Camera 42 can be positioned at fixed position $L_3$ from outlet surface 122 with lens 48 centered on axis C-C on the outlet side of through-hole 112. Meanwhile, light source 46 can be positioned at first position $L_1$ from surface 120 on the inlet side of through-hole 112. Light source 46 can be positioned to illuminate areas of through-hole 112 including substrate 114, coating 116, and outlet 126. Illuminated coating 116 adjacent to outlet 126 can include metallic layer 128, ceramic layer 130, ceramic erosion 132 and exposed metallic 134. Light source 46 can produce light from first position $L_1$ on the inlet side, which can then travel via through-hole 112 to the outlet side, and camera 42 can capture first image data on the outlet side. Camera 42 can transmit the captured first image data to automated vision system 44 for analysis.

Light source 46 can be positioned at second position $L_2$ from surface 120 on the inlet side of through-hole 112. Alternatively, a second light source 46 positioned at second position $L_2$ can be turned on and light source 46 located at first position $L_1$ can be turned off. Light source 46 can be positioned to illuminate areas of through-hole 112 including substrate 114, coating 116, and outlet 126. Illuminated coating 116 adjacent to outlet 126 can include metallic layer 128, ceramic layer 130, ceramic erosion 132, and exposed metallic 134. Light source 46 can produce light from second position $L_2$ on the inlet side, which can then travel via through-hole 112 to the outlet side, and camera 42 can capture second image data on the outlet side. Camera 42 can transmit the captured second image data to automated vision system 44 for analysis.

Figure 4B:
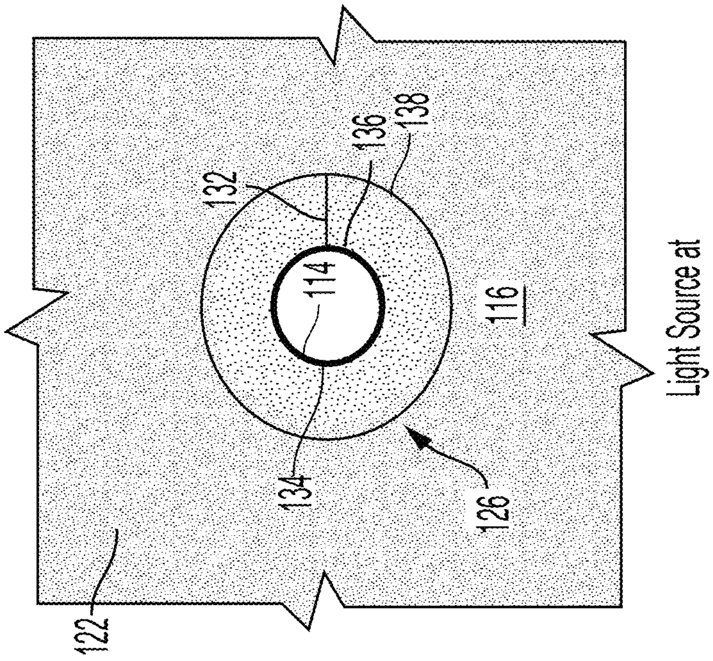
FIG. 4B is a plan view of the outlet of the through-hole of FIG. 4A while a light source is positioned at a first position illuminating an inlet the through-hole.
Figure 4C:
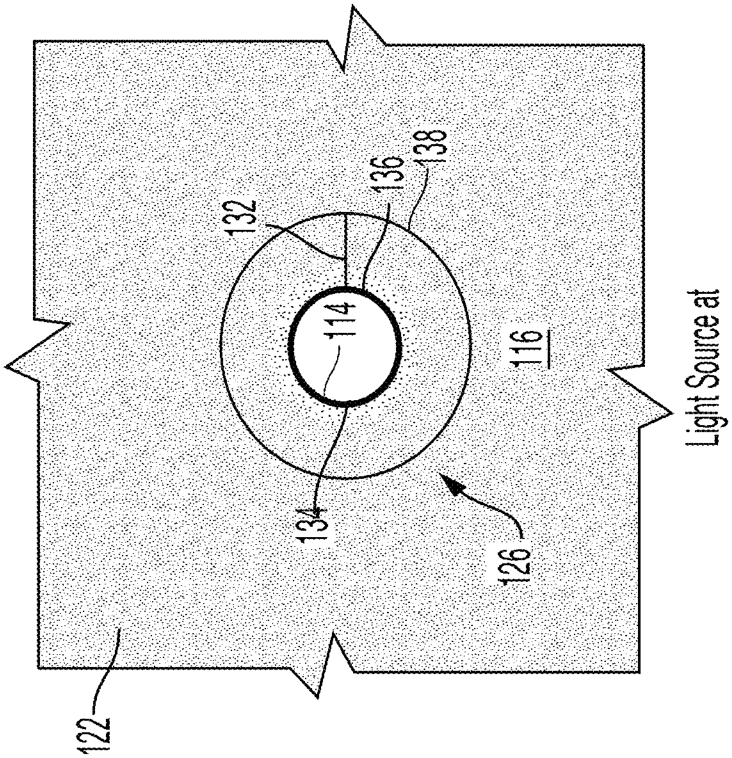
FIG. 4C is a plan view of the outlet of the through-hole of FIG. 4A while the light source is positioned at a second position illuminating an inlet of the through-hole.

FIGS. 4B and 4C are schematic views of captured first image data and captured second image data of through-hole 112 and outlet 126 in component 110. FIG. 4B shows first image data captured when light source 46 is at first portion $L_1$. FIG. 4C shows second image data captured when light source 46 is at second position $L_2$. FIGS. 4B and 4C show outlet 126 at outlet surface 122. Image data can include ceramic erosion 132 and exposed metallic 134. Exposed metallic 134 may or may not be discernable in the captured image data.

As illustrated in FIG. 4B, light source 46 illuminates part of through-hole 112 but not all. The light of light source 46 naturally cannot reach all visible surface areas captured by camera 42 due, in part, to the angle of the light relative to outlet surface 122, the angle of a surface illuminated by the light, and the amount of erosion present in ceramic erosion 132 causing uneven surfaces where light cannot reach. Light source 46 illuminates substrate 114 and coating 116, adjacent to outlet 126, including ceramic erosion 132 and exposed metallic 134, to the extent possible at first position $L_1$. The contrast (lightness/darkness) of illumination will vary across ceramic erosion 132 surface between innermost edge 136 outermost edge 138 as shown in FIG. 4B.

As illustrated in FIG. 4C, light source 46 at second position $L_2$ similarly illuminates part of through-hole 112 but not all. The light of light source 46 naturally cannot reach all visible surface areas captured by camera 42 due, in part, to angle of the light relative to outlet surface 122, the angle of a surface illuminated by the light, and the amount of erosion present in ceramic erosion 132 causing uneven surfaces where light cannot reach. Light source 46 illuminates substrate 114 and coating 116 adjacent to outlet 126, including ceramic erosion 132 and exposed metallic 134 to the extent possible at second position $L_2$. The contrast of illumination will vary across ceramic erosion 132 surface between innermost edge 136 and outermost edge 138, as shown in FIG. 4C.

The contrast in the image data captured by camera 42 of ceramic erosion 132 between innermost edge 136 and outermost edge 138 can vary significantly when light source 46 is located at first position $L_1$ and light source 46 is located second position $L_2$, while contrast of outlet surface 122 and interior walls of hole through substrate 114 does not substantially change. Automated vision system 44 is configured to compare first and second image data to identify the region in which the contrast varies and thereby identify the extent of ceramic erosion 132. Automated vision system 44 is configured to analyze captured images through edge detection methods as previously discussed with respect to FIG. 3C.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A method of inspecting erosion of a coating on a component at an outlet of a through-hole formed by waterjet drilling includes positioning a camera to face the outlet; positioning a light source at a first position from an inlet opposite the outlet of the through-hole; capturing a first image data of the outlet and surrounding coating with the camera while the light source is at the first position; positioning the light source at a second position from the inlet, wherein the first position is located between the inlet and the second position; capturing a second image data of the outlet and surrounding coating with the camera while the light source is at the second position; and determining an amount of erosion of the coating at the outlet by comparing the first image data to the second image data.

The method of inspecting erosion of the coating on the component at the outlet of the through-hole formed by waterjet drilling in the preceding paragraph can optionally include, additionally and/or alternatively, any one or more of the following features, configurations, additional components, and/or steps:

In an embodiment of the above method, a lens of the camera can be oriented parallel to an outlet surface of the component.

In an embodiment of any of the foregoing methods, the light source can be aligned with an axis of the through-hole at the first position.

In an embodiment of any of the foregoing methods, the light source can be aligned with the axis of the through-hole at the second position.

In an embodiment of any of the foregoing methods, positioning the light source at the second position includes moving the light source from the first position to the second position.

In an embodiment of any of the foregoing methods, positioning the light source at the first and second positions includes positioning a first light source at the first position and positioning a second light source at the second position.

In an embodiment of any of the foregoing methods, determining the amount of erosion can include comparing the first image data to the second image data and includes comparing contrast in a region of the coating adjacent to the outlet.

In an embodiment of any of the foregoing methods, determining an amount of erosion can include identifying an outermost edge of the outlet at an outlet surface of the coating.

In an embodiment of any of the foregoing methods, the amount of erosion can further include measuring, parallel to the outlet surface, a maximum distance of erosion from an innermost edge of a sidewall of the through-hole to the outermost edge of the outlet.

In an embodiment of any of the foregoing methods, determining an amount of erosion for a plurality of through-holes can include repositioning the camera and the light source for each of the plurality of through-holes.

In an embodiment of any of the foregoing methods, camera positioning can be automated.

In an embodiment of any of the foregoing methods, light source positioning can be automated.

In an embodiment of any of the foregoing methods, coating can include a ceramic material.

In an embodiment of any of the foregoing methods, the component can be a combustor wall.

In an embodiment of any of the foregoing methods, outlet can have an oblong shape.

In an embodiment of any of the foregoing methods, the camera can output the first image data and the second image data to an automated vision system to determine the amount of erosion present at the outlet of the through-hole.

In an embodiment of any of the foregoing methods, the automated vision system can determine the amount of erosion present at the outlet of the through-hole with an edge detection analysis.

The invention claimed is:

1. A method of inspecting erosion of a coating on a component at an outlet of a through-hole formed by waterjet drilling, the method comprising:
- positioning a camera to face the outlet;
- positioning a light source at a first position from an inlet opposite the outlet of the through-hole;
- capturing a first image data of the outlet and surrounding coating with the camera while the light source is at the first position;
- positioning the light source at a second position from the inlet, wherein the first position is located between the inlet and the second position;
- capturing a second image data of the outlet and surrounding coating with the camera while the light source is at the second position; and
- determining an amount of erosion of the coating at the outlet by comparing the first image data to the second image data by identifying an outermost edge of the outlet at an outlet surface of the coating and by measuring, parallel to the outlet surface, a maximum distance of erosion from an innermost edge of a sidewall of the through-hole to the outermost edge of the outlet.

2. The method of claim 1, wherein a lens of the camera is oriented parallel to an outlet surface of the component.

3. The method of claim 1, wherein the light source is aligned with an axis of the through-hole at the first position.

4. The method of claim 3, wherein the light source is aligned with the axis of the through-hole at the second position.

5. The method of claim 1 wherein positioning the light source at the second position comprises moving the light source from the first position to the second position.

6. The method of claim 1, wherein positioning the light source at the first and second positions comprises:
- positioning a first light source at the first position; and
- positioning a second light source at the second position.

7. The method of claim 1, wherein comparing the first image data to the second image data comprises comparing contrast in a region of the coating adjacent to the outlet.

8. The method of claim 1 and further comprising determining an amount of erosion for a plurality of through-holes, the camera and the light source repositioned for each of the plurality of through-holes.

9. The method in claim 8, wherein positioning the camera is automated.

10. The method of claim 1, wherein positioning the light source is automated.

11. The method of claim 1, wherein the coating comprises a ceramic material.

12. The method of claim 1, wherein the component is a combustor wall.

13. The method of claim 1, wherein the outlet has an oblong shape.

14. The method of claim 1, wherein the camera outputs the first image data and the second image data to an automated vision system to determine the amount of erosion present at the outlet of the through-hole.

15. The method of claim 14, wherein the automated vision system determines the amount of erosion present at the outlet of the through-hole with an edge detection analysis.

16. The method of claim 1, wherein the light source is offset with an axis of the through-hole at the first position.

17. The method of claim 16, wherein the light source is offset with the axis of the through-hole at the second position.

18. A method of inspecting erosion of a coating on a component at an outlet of a through-hole formed by waterjet drilling, the method comprising:
- positioning a camera to face the outlet of the through-hole;
- positioning a light source at a first position facing an inlet of the through-hole opposite the outlet of the through-hole;
- capturing a first image data of the outlet and surrounding coating with the camera while the light source is at the first position;
- positioning the light source at a second position facing the inlet of the through-hole opposite the outlet of the through-hole, wherein the first position is located between the inlet and the second position;
- capturing a second image data of the outlet and surrounding coating with the camera while the light source is at the second position; and
- determining an amount of erosion of the coating at the outlet by comparing the first image data to the second image data.

* * * * *